June 18, 1974  W. N. TORPEY  3,817,857
TREATMENT OF WASTEWATER
Filed Sept. 29, 1972  4 Sheets-Sheet 3

United States Patent Office 3,817,857
Patented June 18, 1974

3,817,857
TREATMENT OF WASTEWATER
Wilbur N. Torpey, Douglaston, N.Y., assignor to
Autotrol Corporation, Milwaukee, Wis.
Filed Sept. 29, 1972, Ser. No. 293,594
Int. Cl. C02c 1/02
U.S. Cl. 210—3                                12 Claims

ABSTRACT OF THE DISCLOSURE

Process and apparatus for the oxidation of carbonaceous and nitrogenous matter in wastewater by use of a mixture of biologically active slimes attached to partially submerged rotating contactors. The biological contactors are mounted in a single-stage treatment unit and are supplied with wastewater at a controlled rate relative to the surface of the contactors and distributed substantially evenly over the contactor surface. A denitrifying unit, located upstream from the single-stage treatment unit is supplied with wastewater and recirculated effluent from the single-stage treatment unit. The denitrifying unit utilizes biologically active slimes attached to rotating biological contactors for the removal of carbonaceous matter from the wastewater supported by nitrate oxygen from the recirculated effluent.

BACKGROUND AND PRIOR ART

The invention pertains to the biological treatment of wastewater to remove pollutants. More specifically, the invention provides a wastewater treatment process and apparatus employing attached cultures of microbiological forms contained in the wastewater that can reduce substantially the quantity of both carbonaceous and nitrogenous pollutants discharged from a treatment plant into natural receiving waters, such as lakes, rivers, and streams.

Prior art wastewater treatment systems are primarily concerned with removing carbonaceous pollutants from the wastewater and secondarily with the removal of other materials such as soluble nitrogenous compounds, e.g., ammonia and nitrates. Recently, increased attention has been given to the presence of nitrates in receiving waters, particularly in potable water supplies. It has been shown that excessive nitrate concentration in drinking water can adversely effect the physiology of infants by reducing the oxygen-carrying capacity of the bloodstream.

Various governmental bodies have responded to the problem of excessive amounts of nitrogenous compounds in natural receiving waters by regulating the permissible concentration of such compounds in wastewater effluents. The State of Maryland has set a limit of 1 mg./liter of nitrogen in the form of ammonia in wastewater discharged into the Patuxent River; the Potomac Enforcement Conference has recently required the removal of 85% of the total nitrogen from all wastewater discharged into receiving waters from the Washington Metropolitan Area; and the State of Illinois, has stipulated that the ammonia-nitrogen concentration in wastewater effluents be reduced to not more than 2.5 mg./liter.

The nitrogenous matter in normal wastewater typically comprises ammonia, a small fraction of intermediate amino compounds, and a large fraction in the form of proteins. The proteinaceous matter in wastewater exists mainly in particulate form and is physically removed, primarily by sedimentation.

Processes for removing ammonia-nitrogen from wastewater follow two general lines of approach: (1) the physio-chemical, and (2) the biological. Physio-chemical processes generally have the basic disadvantage of being costly, producing undesirable side effects, generating a concentrated brine for disposal, and in some cases, polluting the air with ammonia vapors. The biological processes on the other hand, promote the natural cycling of nitrogen, i.e., oxidation of the ammonia and denitrification of the resulting nitrates to nitrogen gas.

A preferred biological process for treating wastewater to oxidize carbonaceous matter utilizes rotating biological contactors in the form of a plurality of closely spaced, partially submerged bodies, to grow fixed biological slimes. The rotating biological contactors can be in the form of thin disks, drums, cylinders, brushes, etc. A preferred contactor has a discontinuous honeycomb-type structure and is disclosed in pending U.S. Patent Application Ser. No. 252,038, filed May 10, 1972.

The partially submerged bodies, are forcibly rotated to alternately expose the organisms on the contact surfaces to the atmosphere for the absorption of oxygen and the wastewater for nutrients.

Such rotating biological contactors, arranged to subject the wastewater to sequential treatment by 4 to 6 stages arranged in series requires about one-third less surface area than would a comparable unit having only a single treatment stage when used for the purpose of removing only carbonaceous matter. Experience has shown that about 400,000 sq. ft. of surface divided into 4 to 6 treatment stages is capable of removing 90% of the carbonaceous matter, measured in terms of $B.O.D._5$ (see Table I for definition) from 1 million gallons per day (M.G.D.) of settled domestic wastewater.

Representative wastewater treatment systems utilizing a multistage configuration of partially submerged rotating biological contactors for the sequential treatment of wastewater are shown and described in Torpey U.S. Pat. 3,575,849; El-Naggar U.S. Pat. 3,335,081; Simpson U.S. Pat. 3,466,241; and Hartmann et al. U.S. Pat. 3,389,798.

When the concentration of carbonaceous matter in waste water has been reduced by about 90% using the above-described multistage system employing rotating biological contactors, a separate and additional multi-staged treatment system is typically used to oxidize the ammonia-nitrogen present in the wastewater. Specific nitrifying organisms attach to and develop on the rotating surfaces of the separate and additional system forming slimes which oxidize the ammonia to nitrates. The subsequent treatment system for biologically oxidizing ammonia loses much of the contact area for the nitrifying slimes as a result of predator activity and requires about 1,000,000 sq. ft. of surface to oxidize substantially all the ammonia in one M.G.D. or normal domestic wastewater.

SUMMARY OF THE INVENTION

In accordance with the invention, a process for simultaneously oxidizing carbonaceous matter and ammonia in wastewater is provided. The new process utilizes partially submerged rotating biological contactors such as disks, arranged in a single treatment stage and supplied with wastewater within a specific range of loading rate with respect to the surface area of the contactors (gallons per day per square foot).

Pursuant to the invention, the rate of wastewater applied substantially equally over the surface of the contactor per unit of time is reduced to a range wherein the concentration of carbonaceous matter at the slime-wastewater interface is so low that the fast growing organisms using carbonaceous nutrients as an energy source are relatively starved. When this environment is created, the slow-growing organisms using ammonia for their nutrition develop and compete successfully with the fast growing organisms using carbonaceous matter. Thus, the faster reaction involving the oxidation of carbonaceous matter is reduced towards the rate of the slower reaction involving the oxidation of nitrogenous matter in a manner that both reactions are forced to proceed simultaneously.

Accordingly, by utilizing a single stage of treatment and by control of the rate of feeding of wastewater to the slimes the same surface is used to support both carbon and nitrogen utilizing organisms for their nutrition. This treatment unit is more efficient than a conventional unit in that it resists loss of contactor surface due mainly to being able to supply the predators with food in the form of organisms using the carbonaceous matter.

The oxidation of ammonia-nitrogen is carried out by specific organisms forming attached slimes whose efficiency is rate-limited by their metabolism. That is to say, since the rate of diffusion of ammonia into the slimes is faster than their metabolic rate, the reaction rates are essentially independent of the concentration of ammonia at the slime-wastewater interface. Accordingly, the amount of ammonia oxidized, at a given temperature, depends on the amount of active organisms occupying a given surface over a span of real time, not time spent in the treatment unit. As a result, when the rate of flow of wastewater increases in accord with the diurnal pattern, an increased concentration of ammonia-nitrogen appears in the effluent. To accomplish a high degree of ammonia removal continuously, allowance should be made to provide surface sufficient to treat time spans of high flow rate, not average flow rate. Alternatively, a tank can be provided after sedimentation large enough to absorb or dampen the flow surges entering the plant.

The diameter of the partially submerged rotatable surfaces is normally in the range of 10 to 12 feet. The slime supporting contactors are rotated so that the peripheral velocity is in the range of about .5 to 1.0 ft./sec. and the spacing between adjacent surfaces is in the range of ⅜ to 1 inch. A considerable advantage can be gained by making the single stage unit adaptable to long-term changes in flow rate by dividing the unit into 4 sections capable of being operated as 1, 2, 3 or 4 sections, as needed, all fed in parallel.

BRIEF DESCRIPTION OF THE DRAWINGS

The invention will be further explained with reference to the drawing in which.

DESCRIPTION OF PREFERRED EMBODIMENTS

Figure 1:
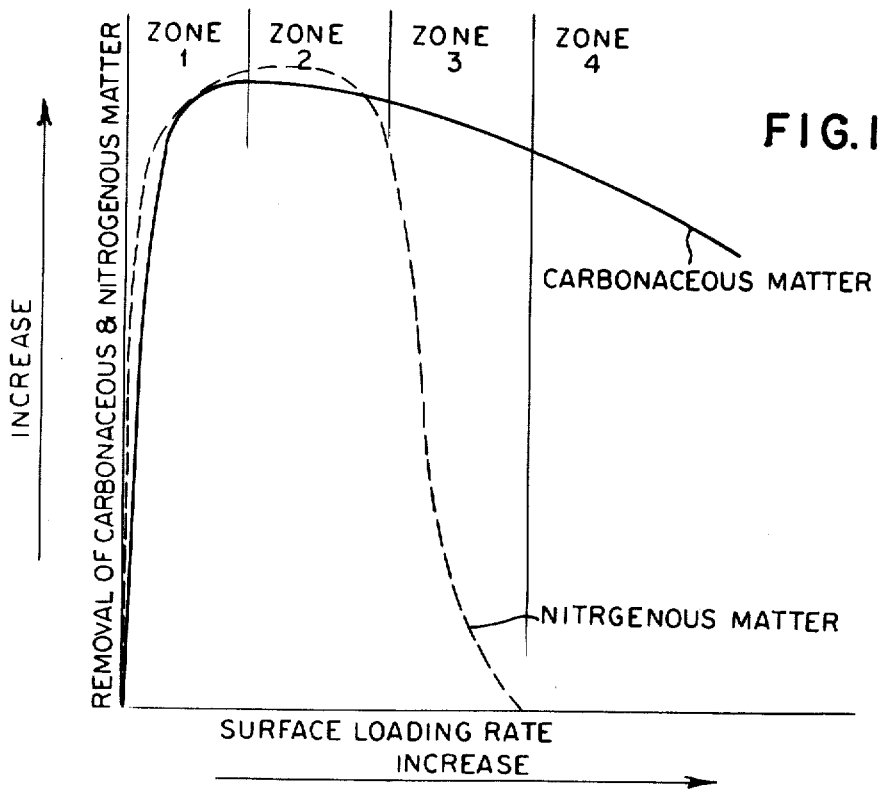
FIG. 1 is a pair of curves showing the effect of contactor surface loading rate on pollutant removal.

Referring to Fig. 1, the relationship of contactor surface loading rate to both carbonaceous and nitrogenous pollutant removal is shown in terms of four basic zones of biological activity.

Zone 1 embraces a transitory range of loading wherein varying degrees of starvation have been induced for both the organisms using carbonaceous and nitrogenous matter.

Zone 2 defines a range of loading rates, wherein a preferred degree of starvation for organisms using carbonaceous matter has been induced, while the activity of organisms using nitrogenous matter is relatively unrestricted. The loading rates defined by Zone 2 is from about 0.4 to about 1.5 gallons per day per square foot of contactor surface.

Zone 3 represents a range of loading rates, wherein increases cause organisms using carbonaceous matter to increasingly dominate the environment, resulting in a rapid decrease in the rate of oxidation of nitrogenous matter.

Zone 4 defines a range of loading rates at which the concentration of carbonaceous matter at the slime-wastewater interface is sufficiently high to cause the organisms using carbonaceous matter to completely dominate the environment, thereby preventing the growth of nitrifying organisms.

Figure 2:
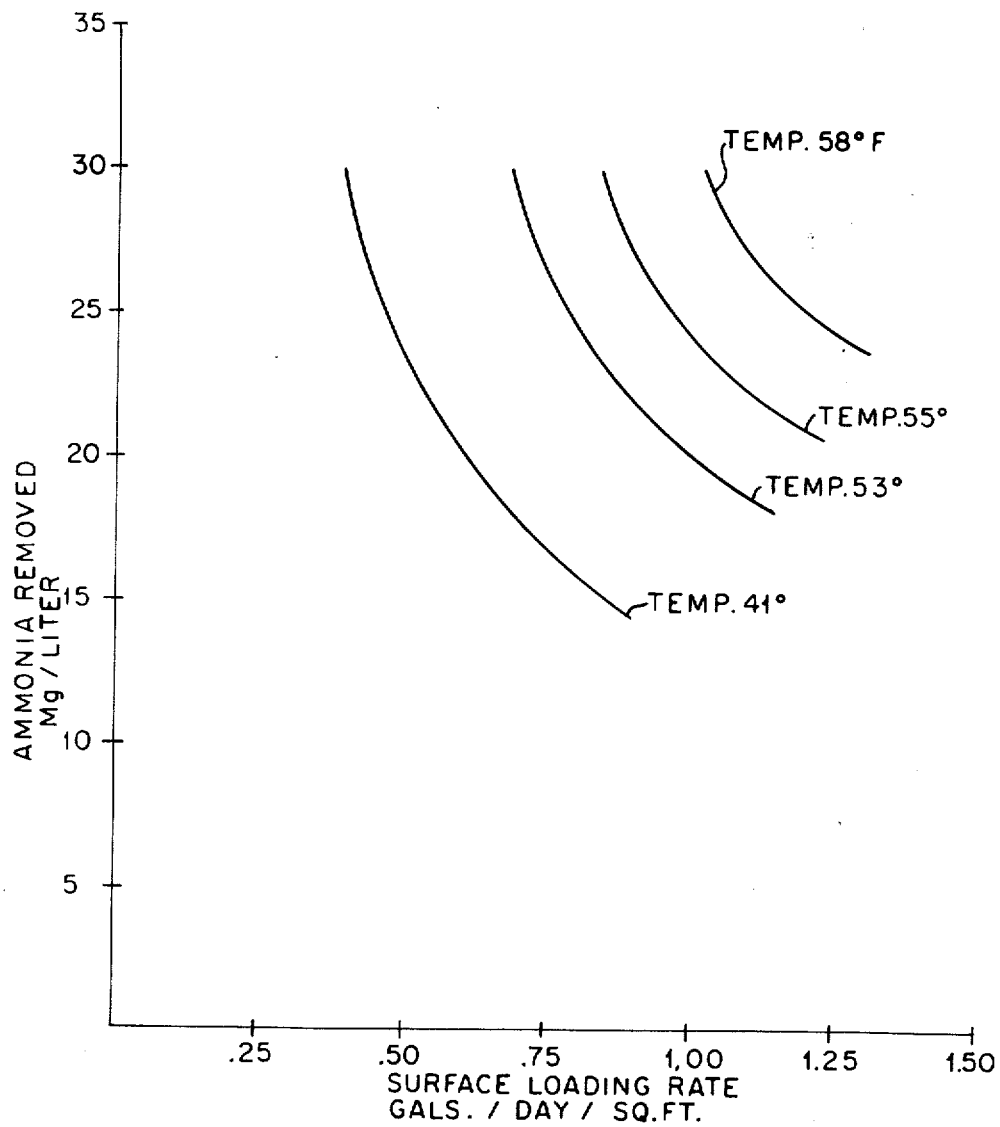
FIG. 2 is a series of curves showing the relationship of contactor surface loading rate to the mg./l. of ammonia removed from wastewater at various temperatures.

Referring now to FIG. 2, the relationship of ammonia removal to contactor surface loading rate for various wastewater temperatures is shown.

The temperatures shown in FIG. 2 embrace the lower values of the range of wastewater temperatures encountered in most treatment plants. Because a treatment plant should be designed to treat the coldest wastewater encountered, a selection of loading rate to conform to such minimum temperature should be made. For example, if it were desired to remove about 25 mg./liter of the ammonia-nitrogen from normal domestic wastewater using a single stage of treatment, the surface loading rate should be about 0.52 gal./day/sq. ft., if the minimum wastewater temperature expected was 41° F. At a minimum wastewater temperature of 58° F., the comparable loading rate should be about 1.25 gal./day/sq. ft.

As shown in FIG. 2, the slime growing surface requirement to remove 90% of the carbonaceous and nitrogenous matter for a typical plant processing 1 million gal./day of normal wastewater having 25 mg./liter of ammonia at a temperature of 55° F. would be 1 gal./day/sq. ft. or 1,000,000 sq. ft. A conventional prior art treatment process would require about 1,400,000 sq. ft. of surface for equivalent pollutant removal. Further, by the use of the single stage of treatment pursuant to the invention, a significant large fraction of the combined nitrogen in the wastewater undergoing treatment is reduced to nitrogen gas, thus lowering the nitrogen concentration in the effluent without adding to the cost of treatment.

Pursuant to a specific aspect of the invention, a preferred contactor surface loading rate of from about 0.4 to about 1.5 gal./day/sq. ft. is defined; which rate results in the removal of the bulk of carbonaceous and nitrogenous matter from the influent wastewater. The contactor surface loading rate is a function of the temperature of the wastewater being treated as shown in FIG. 2. In some cases, it might be desirable to operate with a contactor surface loading rate as high as 2.0 gal./day/sq. ft. if, for instance, the lowest anticipated wastewater temperature was above about 60° F. or if it was desired to remove a lesser amount of ammonia from the influent or if the wastewater concentration of nitrogeneous matter is dilute. In further accordance with this specific aspect of the invention, contactor surface loading rates of 2 gal./day/sq. ft. or even higher can be used by increasing the oxygen content of the atmosphere above the wastewater surface in the single stage treatment unit. The atmosphere over the rotating contactors can be enclosed and enriched with oxygen to the extent that the resulting atmosphere contains up to about 60% by volume of oxygen, resulting in increased efficiency of oxidizing carbonaceous and nitrogenous material in the wastewater. A contactor surface loading rate from about 1 to about 2.5 gal./day/sq. ft. can be utilized when the atmosphere above the rotating contactors contains from about 30 to about 60% by volume of oxygen.

Figure 3:
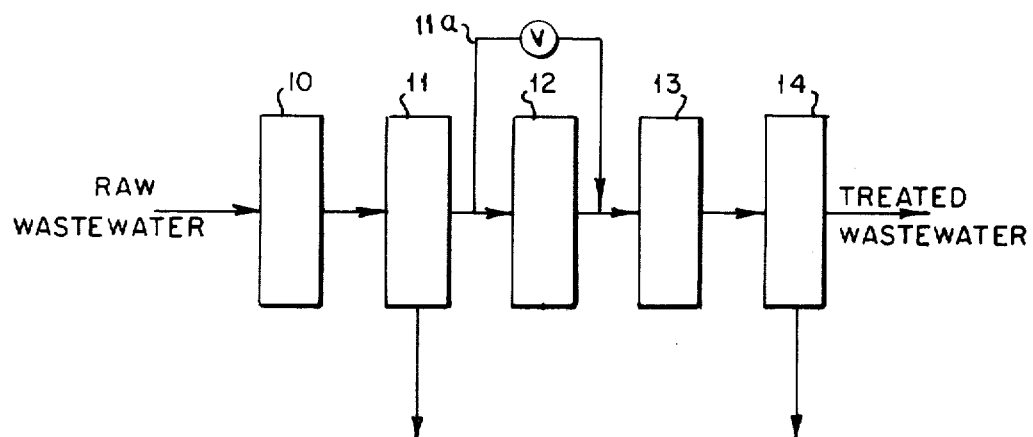
FIG. 3 is a schematic flow diagram of a process in accordance with the invention.

FIG. 3 schematically illustrates a wastewater treatment process incorporating the principles of the invention.

Referring to FIG. 3, raw wastewater is supplied to a coarse screening and grit removal device 10 followed by the removal of settleable and floatable solids in settling tank 11 which is usually designed to provide 1 to 2 hours of detention time for the wastewater at average flow rate.

Optionally, a fine screening device may be substituted for 10 and 11.

From the settling tank 11, the wastewater may be conducted directly to unit 13 by bypass line 11a or to holding tank 12 having a volume adequate to absorb the diurnal fluctuations in flow rate. Means, typically a rate controller device or pump, are provided at the outlet of holding tank 12 to supply a substantially constant rate of flow of wastewater to the single stage partially submerged rotating surface treatment unit 13, which is operated within a specific range of surface loading rates to oxidize simultaneously the carbonaceous and nitrogenous matter present in the wastewater.

The biologically treated wastewater is then conducted to a secondary solids separation unit 14, which typically comprises a settling tank having 1 to 2 hours of detention time or a microstrainer.

Figure 4:
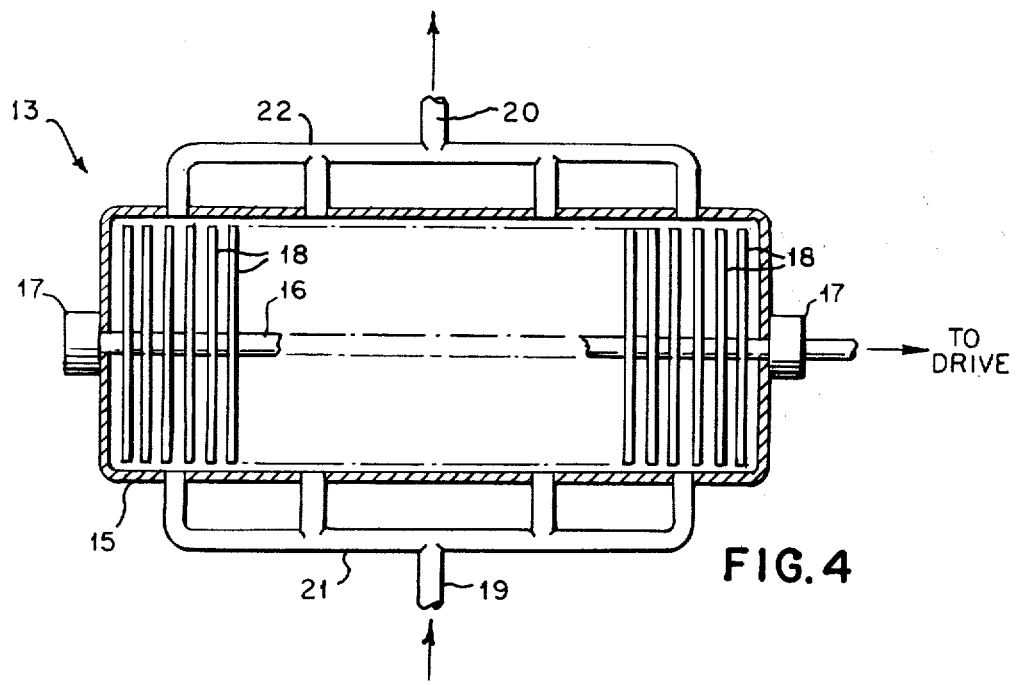
FIG. 4 is a schematic plan view showing the single stage biological treatment unit employing rotating biological contactors.

The single stage biological treatment unit 13 is shown schematically in further detail in FIG. 4. The single stage biological treatment unit 13 includes a tank 15 of the same general configuration as the rotating surfaces below the longitudinally extending rotatable shaft 16. The rotatable shaft 16 is supported by appropriate bearings 17 and is rotated by an appropriate drive mechainsm (not shown). A plurality of biological contactors 18 are mounted on shaft 16 transverse to its axis and spaced along its length. The contactors 18 are typically from about 10 to about 12 feet in diameter; spaced about ⅜ to 1 inch apart and may extend into the wastewater contained by tank 15 from about ⅓ to ⅔ of their diameter. The contactors are rotated at a peripheral velocity of about 0.25 to about 1 foot per second to alternately supply the organisms growing thereon with atmospheric oxygen and nutrients.

Wastewater is supplied to tank 15 by pipe 19 and the treated effluent leaves through discharge pipe 20. Preferably, both the supply pipe 19 and discharge pipe 20 communicate with inlet and outlet manifold units 21 and 22, respectively. The manifold units 21 and 22 serve to distribute the wastewater along the length of the treatment unit, which, in addition to mixing within the tank accomplished by moving surfaces, serves to feed all the slime surfaces substantially equally.

The following example further illustrates the process of the invention.

Table I shows the results of processing settled wastewater in a single stage biological treatment unit. The unit used was a half formed cylindrical tank with a radius of 5 feet 2 inches containing 5,250 sq. ft. of contactor surface. The contactors were in the form of thin disks, having a 10 foot diameter, and spaced 0.8 inches apart. The disks were immersed in the wastewater 40% of their vertical diameter and were rotated at 1 r.p.m.

contactor surfaces remain thin, that is below ⅛ inch and usually below 1/16 inch thickness which permits reduction of the spacing between adjacent contactors from a typical ¾ inch to as low as ⅜ inch without undue loss of detention time necessary to remove about 90% of the carbonaceous matter measured in terms of $B.O.D._5$.

Further, in accordance with the invention, the peripheral velocity of the rotating contactors can be reduced from 1 ft./sec. toward 0.3 ft./sec. as the loading rate is decreased from 1.5 towards 0.4 gal./day/sq. ft., without lowering the dissolved oxygen in the wastewater below about 20% of saturation. Such controlled decrease of the rotational velocity of the contactors provides a significant economic benefit by reducing the energy necessary to rotate the contactors, which varies directly with the cube of the rotational velocity. The invention further provides that when the contactor peripheral velocity is controlled between 0.3 to 1.0 ft./sec. as disk loading rate is varied within the preferred range of 0.4 to 1.5 gal./day/sq. ft., denitrification can be forced as the organisms in the slimes use nitrate oxygen for their respiration. If the peripheral velocity of the contactors is too slow for the particular unit area loading rate of wastewater on the rotating surface, anaerobic conditions will develop. On the other hand, if the peripheral velocity of the rotating surfaces is too high, the conversion of nitrates to nitrogen gas will be reduced.

The new process will reduce the $B.O.D._5$ in normal domestic wastewater from about 200 to 10 mg./liter and will oxidize ammonia-nitrogen according to surface loading rate. Moreover, a significantly large portion of the combined nitrogen is reduced to nitrogen gas which is evolved to the atmosphere. The remaining combined nitrogen, especially that in the form of nitrates, might require reduction to a lower level to meet new standards where potable water supplies are directly involved or to lessen the enrichment of the receiving waters with nitrogen, which accelerates unwanted algae growth.

Accordingly, to reduce further the concentration of nitrates in the process effluent, the invention provides means for subjecting the treated wastewater to additional treatment using biological slimes on rotating surfaces. The additional denitrification treatment takes the form of a relatively small stage of rotating surfaces, situated prior to the single stage rotating surface biological treatment unit 13, heretofore described. The influent settled wastewater, along with recirculated flow from the main biological treatment unit, is treated by this denitrification stage. Preferably, atmospheric oxygen is physically ex-

TABLE I

| Flow rate, gals./day | Temp., °F. | Disk loading rate, gals./ft./day | Influent** $B.O.D._5$,* mg./l. | $NH_3$-N, mg./l. | Effluent $B.O.D._5$,* mg./l. | $NH_3$-N, mg./l. | $NO_3$-N, mg./l. | Loss of N, mg/l. |
|---|---|---|---|---|---|---|---|---|
| 4,500 | 41 | 0.9 | 125 | 30 | 21 | 16 | 4 | 10 |
| 6,800 | 42 | 1.3 | 131 | 25 | 15 | 13 | 6 | 6 |
| 5,900 | 46 | 1.1 | 129 | 26 | 14 | 13 | 8 | 5 |
| 6,000 | 53 | 1.1 | 121 | 28 | 12 | 9 | 13 | 6 |
| 5,600 | 58 | 1.1 | 109 | 30 | 15 | 2 | 17 | 11 |

*Biological oxygen demand. $B.O.D._5$ is a measure of the concentration of biodegradable organic carbon in a medium obtained by determining the amount of oxygen consumed (mg./l.) by the medium at 68° F. in five days
**Influent—presettled wastewater The data of Table I indicates that when operating a single stage rotating disk biological treatment unit with a loading rate of from 0.9 to 1.3 gal./day/sq. ft. of settled wastewater on the contactor surfaces, about 90% of the $B.O.D._5$ remaining after presettling was removed along with the simultaneous reduction of ammonia-nitrogen concentration from 30 to 16 mg./liter at 41° F. and from 30 to 2 mg./liter at 58° F. The same slimes were thus shown capable of oxidizing the carbonaceous and nitrogenous matter.

Additional important advantages are derived from the use of a single stage rotating disk biological treatment process having a loading rate controlled within the range defined by the invention. The slimes that develop on the cluded by either completely submerging the contactors in the wastewater or providing a physical enclosure over the partially submerged contactors, to force the organisms that develop on the rotating surfaces to use substantially all the nitrate oxygen in the recirculated flow for their respiration.

Figure 5:
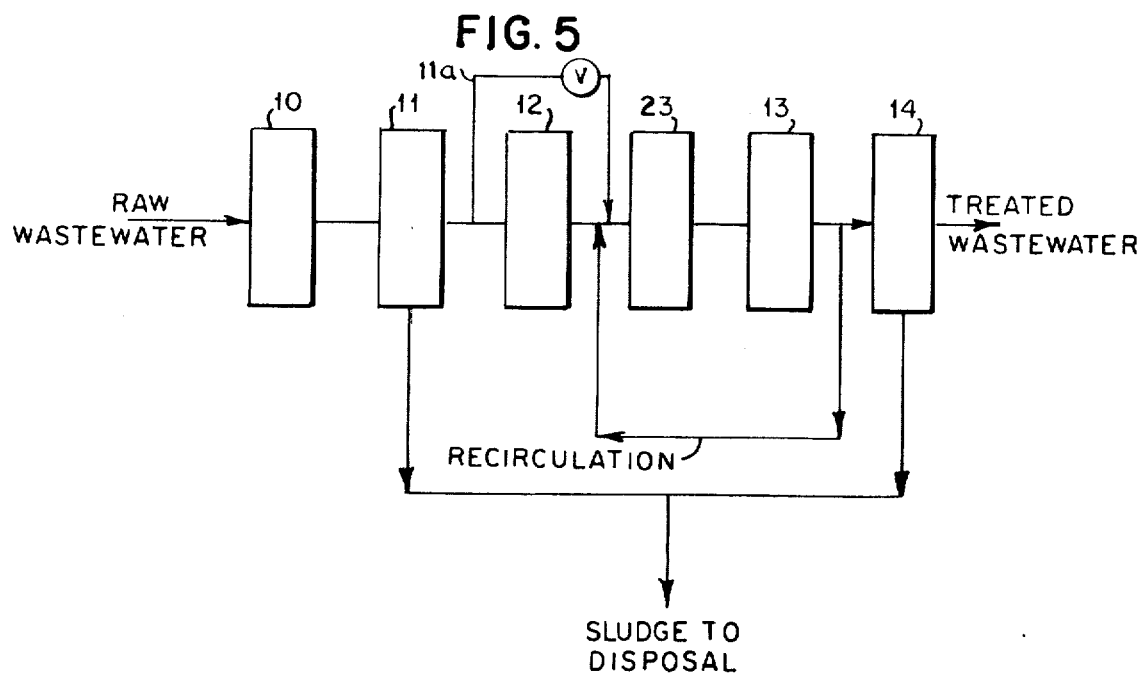
FIG. 5 is a schematic flow diagram of an alternative process in accordance with the invention.

A typical flow diagram of the treatment steps incorporating the use of the denitrifying unit of the invention is shown in FIG. 5. Referring to FIG. 5, raw wastewater is supplied to a coarse screening and grit removal device 10 with provision for conducting the wastewater to a settling tank 11 for the removal of settleable and floatable solids. The settling tank 11 is usually designed to provide 1 to 2 hours detention time at average flow rate. Optionally, a fine screening device may be substituted for units 10 and 11.

From the settling tank 11 the wastewater can be supplied directly to unit 23 by bypass line 11a or optionally to a holding tank 12 having a volume adequate to absorb or dampen the diurnal fluctuations in flow rate. Means, such as a rate controller device or pump, are provided at the outlet of holding tank 12 to supply a substantially constant rate of flow of wastewater to the denitrifying unit 23. Denitrifying unit 23 also receives flow recirculated from the effluent of the main biological treatment unit 13. The denitrifying unit 23 utilizes partially submerged rotating contactors, supporting slimes which are forced to utilize oxygen from the nitrates provided in the recirculated wastewater by the exclusion of atmospheric oxygen.

From the denitrifying unit 23 the wastewater enters a biological treatment unit 13 which corresponds to the single stage biological treatment unit of FIG. 3, previously described. The biological treatment unit 13 effects the removal of substantially all the residual carbonaceous matter, as well as the oxidation of ammonia-nitrogen present in the effluent from the denitrification unit 23.

The biologically treated wastewater is conducted from unit 13 to a secondary solids separation unit 14 which is typically a settling tank having about a 1 to 2 hour detention time. A microstrainer may be substituted for the solids separation process effected by unit 14 with the wash water conducted to mix with the influent to settling tank 11.

The foregoing two stage treatment process, operated in accordance with the principles set forth, is capable of treating the wastewater to such a high degree with respect to the removal of combined nitrogen that much of the nitrates formed by the oxidation processes are converted to inert nitrogen gas. This is accomplished in an economic manner through the use of carbonaceous matter already in the wastewater as an energy source rather than having to be burdened by the expense of adding organic matter, such as methanol, to the wastewater.

Figure 6:
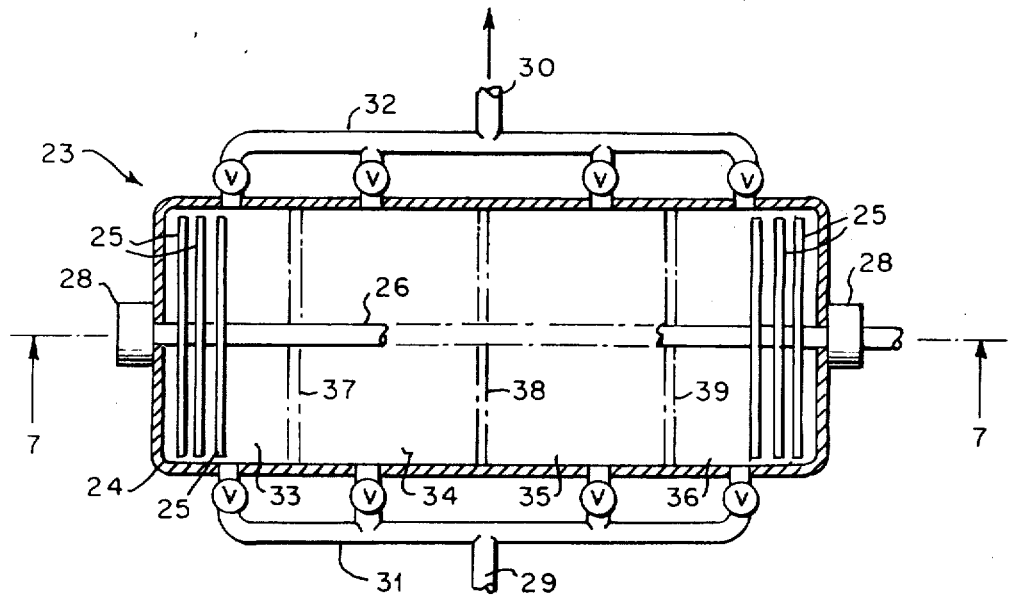
FIG. 6 is a schematic plan view showing a single stage denitrifying unit in accordance with the invention.
Figure 7:
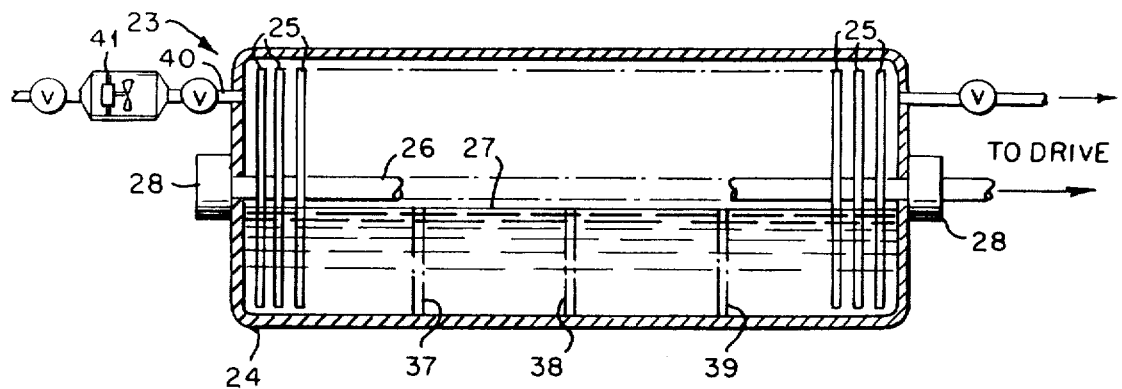
FIG. 7 is a cross-sectional elevation of the unit of FIG. 6 taken along line 7—7.

The denitrifying unit 23 is shown in further detail in FIGS. 6 and 7. The denitrifying unit 23 includes a tank 24 containing a plurality of biological contactors 25 mounted for rotation on shaft 26 which is supported by appropriate bearings 28 and driven by an appropriate drive mechanism (not shown). The biological contactors 25 are typically from about 10 to about 12 feet in diameter. The slime supporting contactors typically have a spacing between adjacent surfaces of from about ½ to about 1 inch and are rotated at a peripheral velocity between about 0.5 and 1 ft./sec. to limit slime thickness. Typically, the level of wastewater in unit 23 is below shaft 16 as indicated by surface 27 in FIG. 7, although, as previously indicated, the unit can be operated with the contactors fully submerged to deprive the slimes of atmospheric oxygen.

The dentrifying stage 23 receives normal settled wastewater plus recirculated flow from the main biological treatment unit 13 through inlet conduit 29 at rates from about 100 to about 300 percent of the flow rate of wastewater entering the plant, depending on the proportion of the nitrates desired to be reduced. As much as 75 percent of the recirculated nitrates can be reduced to nitrogen gas by this method of operation. The treated effluent leaves through conduit 30.

Preferably, both the supply conduit 29 and discharge conduit 30 communicate with unit 23 through inlet and outlet manifolds 31 and 32. Tank 24 is preferably divided into a plurality of separate chambers 33-36 by partitions 37-39, which are fed in parallel by inlet manifold 31 as needed, to effect process control, i.e., the maintenance of predetermined conditions such as loading rate of the contactors with varying flow rates. A similar parallel chamber configuration can be used with the main biological treatment unit 13 if desired or necessary.

In accordance with the primary objective of the denitrifying unit 23, namely, to force the slimes growing on contactors 25 to utilize a maximum amount of nitrate oxygen from the recirculated wastewater for their metabolism, provision is made to strictly control or entirely eliminate the supply of atmospheric oxygen to the slimes. Accordingly, unit 23 can be operated with contactors 25 completely submerged in the wastewater or, as shown in FIG. 7, the tank 24 can be entirely physically enclosed.

To avoid anaerobic conditions from arising in unit 23, a controlled amount of atmospheric oxygen can be supplied to the upper portion of tank 24. Atmospheric oxygen can be supplied to tank 24 by means of a supply conduit 40 through which air is supplied to the portion of tank 24 above the wastewater level by fan 41. An outlet conduit 42 is provided to remove air from tank 24. The amount of oxygen supplied to tank 24 by means of conduit 40 and fan 41 is chosen to maximize nitrate oxygen consumption by the slimes supported by contactors 24 while avoiding anaerobic conditions.

Anaerobic conditions in unit 23 with a predetermined amount of contactor surface can be avoided by three primary means, either individually or preferably in combination, while maximizing nitrate oxygen consumption by the growing organisms. Firstly, as previously indicated, the unit 23 can be operated with a number of separate chambers, some or all of which may be fed at any particular time. Secondly, the peripheral velocity of the contactors can be varied between about 0.5 and 1.0 ft./sec. to control the amount of oxygen consumed by the growing organisms and, thirdly, the amount of atmospheric oxygen available to the slimes can be regulated by means of physically enclosing tank 24, and controlling the supply of air to the tank portion above the wastewater furnished by fan 41 and the valved conduit 40.

The denitrifying unit can be sized to provide surface adequate to reduce substantially all the nitrates in the recirculated flow yet not so large as to develop an anaerobic environment with such consequent adverse side effects as the production of hydrogen sulphide. In order to satisfy these requirements over a range of recirculation of from 100 to 300% of the treated wastewater flow, the loading rate of settled wastewater, not including the recirculated flow, on the area of rotating surfaces of denitrification unit should be controlled to lie in the range of 4 to 16 gallons per day per square foot.

What is claimed is:

1. Process for the treatment of wastewater to biochemically remove a substantial portion of the nitrogenous and carbonaceous pollutants present therein without the the addition of an external energy source of carbonaceous material comprising (a) introducing raw wastewater at a first predetermined rate to a primary treatment unit for the removal of particulate material,
    (b) supplying the effluent wastewater from said primary treatment unit to a denitrifying unit having a plurality of partially submerged biological contactors rotatably mounted therein,
    (c) supplying the effluent from said denitrifying unit to a biological treatment unit having rotatably mounted therein a plurality of partially submerged biological contactors containing surface area suitable for the growth and maintenance of attached organisms,
    (d) forcibly rotating said contactors of said biological treatment unit at a predetermined peripheral velocity to alternately expose the attached organisms to oxygen and the wastewater to biochemically oxidize carbonaceous and nitrogenous pollutants,
    (e) removing treated wastewater from said biological treatment unit, (f) recirculating a portion of said treated wastewater from said biological treatment unit to said denitrifying unit at a second predetermined rate, said second predetermined rate being from 100 to 300% of said first predetermined rate, (g) forcibly rotating said biological contactors of said denitrifying unit at a peripheral velocity suitable for the growth and maintenance of attached denitrifying organisms, and (h) excluding molecular oxygen from said denitrifying unit to force said denitrifying organisms to consume oxygen from said oxidized nitrogenous pollutants present in the recirculated treated wastewater, (i) said excluding of molecular oxygen step being accomplished by providing a physical barrier between said partially submerged contactors of said denitrifying unit and the atmosphere.

2. Process for the treatment of wastewater containing carbonaceous and nitrogenous pollutants to biochemically remove a substantial portion of said nitrogenous pollutants and to biochemically oxidize a substantial portion of said carbonaceous pollutants comprising the steps of, (a) supplying said wastewater at a first predetermined rate to a denitrifying unit having a plurality of biological contactors rotatably mounted therein, (b) supplying the effluent from said denitrifying unit to a biological treatment unit having rotatably mounted therein a plurality of partially submerged biological contactors containing surface area suitable for the growth and maintenance of attached organisms, (c) forcibly rotating said contactors of said biological treatment unit at a predetermined peripheral velocity to alternately expose the attached organisms to oxygen and the wastewater to biochemically oxidize carbonaceous and nitrogenous pollutants, (d) removing treated wastewater from said biological treatment unit, said treated wastewater containing oxidized nitrogenous pollutants, (e) recirculating a portion of said treated wastewater from said biological treatment unit to said denitrifying unit at a second predetermined rate, (f) forcibly rotating the biological contactors of said denitrifying unit at a peripheral velocity suitable for the growth and maintenance of attached denitrifying organisms, and (g) excluding molecular oxygen from the biological contactors of said denitrifying unit to force said denitrifying organisms to consume oxygen from said oxidized nitrogenous pollutants, (h) said second predetermined rate being from about 100% to about 300% of said first predetermined rate, and being chosen to supply an adequate amount of oxygen in the form of oxidized nitrogenous pollutants to said denitrifying unit for the respiration of said denitrifying organisms, (i) whereby said denitrifying organisms are grown and maintained without the addition of an external energy source of carbonaceous material to said denitrifying unit.

3. Process according to claim 2 wherein said first predetermined rate is from 4 to 16 gallons per day per square foot of contactor surface in said denitrifying unit.

4. Process according to claim 2 wherein molecular oxygen is excluded from the biological contactors of said denitrifying unit by completely submerging said contactors in the wastewater.

5. Process according to claim 2 wherein the contactors of both the denitrifying unit and the biological treatment unit are forcibly rotated at a peripheral velocity from 0.25 to 1.0 ft./sec.

6. Process according to claim 2 wherein all of said biological contactors in said denitrification unit are supported on a single rotatable shaft and said wastewater flows through said denitrification unit in a direction generally perpendicular to said shaft.

7. Process according to claim 2 wherein all of said biological contactors of said biological treatment unit are supported on a single rotatable shaft and said wastewater flows through said biological treatment unit in a direction generally perpendicular to said shaft.

8. Process according to claim 2 wherein said second predetermined rate is from 100 to 300% of said first predetermined rate.

9. Process according to claim 1 wherein all of said biological contactors in said denitrification unit are supported on a single-rotatable shaft and said wastewater flows through said denitrification unit in a direction generally perpendicular to said shaft.

10. Process according to claim 1 wherein all of said biological contactors of said biological treatment unit are supported on a single rotatable shaft and said wastewater flows through said biological treatment unit in a direction generally perpendicular to said shaft.

11. Process according to claim 9 wherein all of said biological contactors of said biological treatment unit are supported on a single rotatable shaft and said wastewater flows through said biological treatment unit in a direction generally perpendicular to said shaft.

12. Process according to claim 6 wherein all of said biological contactors of said biological treatment unit are supported on a single rotatable shaft and said wastewater flows through said biological treatment unit in a direction generally perpendicular to said shaft.

References Cited

UNITED STATES PATENTS

| | | | |
|---|---|---|---|
| 3,596,767 | 8/1971 | Antonie | 210—195 X |
| 3,557,954 | 1/1971 | Welch | 210—17 |
| 3,335,081 | 8/1967 | El-Naggar | 210—15 |
| 3,547,815 | 12/1970 | McWhirter | 210—7 |
| 3,266,786 | 8/1966 | Grimes et al. | 261—92 |
| 2,077,498 | 4/1937 | Streander | 210—253 |
| 3,704,783 | 12/1972 | Antonie | 210—17 X |
| 3,654,147 | 4/1972 | Levin et al. | 210—6 |

THOMAS G. WYSE, Primary Examiner

U.S. Cl. X.R.

210—16, 17